US011392629B2

(12) United States Patent
Agarwal (10) Patent No.: US 11,392,629 B2
(45) Date of Patent: Jul. 19, 2022

(54) TERM SELECTION FROM A DOCUMENT TO FIND SIMILAR CONTENT

(71) Applicant: Oracle International Corporation, Redwood Shores, CA (US)

(72) Inventor: Pranav Kumar Agarwal, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 813 days.

(21) Appl. No.: 14/546,340

(22) Filed: Nov. 18, 2014

(65) Prior Publication Data

US 2016/0140231 A1 May 19, 2016

(51) Int. Cl.
*G06F 16/33* (2019.01)

(52) U.S. Cl.
CPC .................. *G06F 16/334* (2019.01)

(58) Field of Classification Search
CPC .. G06F 17/30675; G06F 17/30; G06F 16/334; G06F 16/9574; G06F 16/2365
USPC ......................................... 707/749
See application file for complete search history.

(56) References Cited

U.S. PATENT DOCUMENTS

| 5,835,087 | A | * | 11/1998 | Herz | .................... | G06Q 20/383 |
| | | | | | | 348/E7.056 |
| 7,840,521 | B2 | | 11/2010 | Aoki | | |
| 8,571,317 | B2 | | 10/2013 | Welling et al. | | |
| 8,700,543 | B2 | | 4/2014 | Glickman | | |
| 2012/0209853 | A1 | * | 8/2012 | Desai | .................. | G06F 16/3344 |
| | | | | | | 707/E17.014 |
| 2014/0046776 | A1 | | 2/2014 | Kanigsberg et al. | | |

FOREIGN PATENT DOCUMENTS

| EP | 1 843 256 A1 | 4/2006 | |
| EP | 06251870 A | * 10/2007 | ......... G06F 16/3344 |
| EP | 06251870 A | * 10/2007 | ......... G06F 16/3344 |

OTHER PUBLICATIONS

Positional Language Models for Information Retrieval; SIGIR Jul. 19-23, 2009., Yuanhua Lv, ChengXiang Zhai; pp. 1-8 https://s3.amazonaws.com/academia.edu.documents/30739201/sigir09-PLM.pdf.*

(Continued)

*Primary Examiner* — Hosain T Alam
*Assistant Examiner* — Tracy M McGhee
(74) *Attorney, Agent, or Firm* — Kilpatrick Townsend & Stockton LLP (57) ABSTRACT

Methods, devices, and systems are described for creating and implementing search query vectors for knowledge base articles or other formal articles, the query vectors automatically created from informal correspondence such as a service request email to an information technology (IT) department. Term frequency-inverse document frequency (TF-IDF) scores are calculated for rarewords in the correspondence with respect to a corpus of other service requests. High scoring terms with the same neighbors as those in the corpus of formal articles are added to the search query vector, while high scoring terms that do not share the same neighbors are thrown out. The query vector is then used to run a search of the knowledge base for relevant articles.

19 Claims, 6 Drawing Sheets

(56) References Cited

OTHER PUBLICATIONS

Positional Language Models for Information Retrieval; SIGIR Jul. 19-23, 2009., Yuanhua Lv, ChengXiang Zhai; pp. 1-8) (Year: 2009).*
Semantic Search Engine using Joomla Framework with Modified tf-idf and TRApriori Algorithm, International Journal of Computer Applications (0975-8887) vol. 52—No. 16, Aug. 2012. pp. 17-23., Yogendra Kumar Jain) (Year: 2012).*
Positional Language Models for Information Retrieval; SIGIR Jul. 19-23, 2009., Yuanhua Lv, ChengXiang Zhai; pp. 1-8) (Year: 2009).*
SemanticSearchEngineusingJoomlaFrameworkwith Modifiedtf-idfandTRApriori Algorithm, InternationalJournalofComputer Applications(0975-8887)vol. 52—No. 16,Aug. 2012.pp. 17-23.,YogendraKumarJain)(Year:2012) (Year: 2012).*
PositionalLanguageModelsforInformationRetrieval;SIGIRJul. 19-23 2009.,YuanhuaLv,ChengXiangZhai; pp. 1-8)(Year:2009) (Year: 2009).*
Jain et al., "Semantic Search Engine using Joomla Framework with Modified tf-idf and TRAprioir Algorithm," International Journal of Computer Applications (0975-8887), Aug. 2012, vol. 52, No. 16, pp. 17-23.
Kuric et al., "Search in Source Code Based on Identifying Popular Fragments," Proceedings from 39th International Conference on Current Trends in Theory and Practice Computer Science, Jan. 26-31, 2013, pp. 408-419, http://www2.fiit.stuba.sk/~bielik/publ/abstracts/2013/kuric-sofsem2013.pdf.
Lopez et al., "A Competitive Term Selection Method for Information Retrieval," A. Gelbukh (ed.): CICLing Feb. 2007, LNCS vol. 4394, pp. 468-475.
Lv et al., "Positional Language Models for Information Retrieval," SIGIR '09, Jul. 19-23, 2009, pp. 299-306.
"Calculate Cosine Similarity Score," Sep. 26, 2008, 26 pages www.ics.uci.edu/~djp3/classes/2008_09_26_CS221/lectures/lecture26.pdf.
"Positional Relevance Model (PRM) (Source code download)," Positional relevance model for pseudo-relevance feedback, http://sifaka.cs.uiuc.edu/~ulv2/pub/prm/prm.htm, retrieved Sep. 5, 2014, 2 pages.

* cited by examiner

TERM SELECTION FROM A DOCUMENT TO FIND SIMILAR CONTENT

CROSS-REFERENCES TO RELATED APPLICATIONS

NOT APPLICABLE

BACKGROUND

1. Field of the Art

Generally, the present application relates to data processing. Specifically, the application is related to searching techniques for formal knowledge bases using informal correspondence.

2. Discussion of the Related Art

In a customer relationship management (CRM) environment, there are often two repositories:
1) A repository containing knowledge base articles written by technical writers and subject matter experts; and
2) A repository containing service requests (SRs). Each service request records the issue faced by the customer and also records the interactions and actions taken by the customer and engineer to resolve the issue.

To search the knowledge base for answers to customers' service request problems, keywords are often taken from the service requests and placed into a search query string. This is performed by a human software technician, who may add his or her own keywords. The combination of keywords may better classify the symptoms and identify the problem for which there is a solution. The query string is then used to run a search on the repository of knowledge base articles.

The 'human in the loop' portion of the help desk system invariably rests on training, effort, and responsiveness of the technicians. It also rests on people using a similar set of keywords so that information can be shared efficiently among them.

There is a need in the art for provide high precision knowledge articles can be very useful however presenting knowledge articles those are not relevant can lead to wasted effort.

BRIEF SUMMARY

Generally, a search query vector for knowledge base articles is created from a service request (correspondence) by scoring words in the service request with respect to other service requests, finding neighboring high-scoring words in the service request, and then adding the words to the search query vector only if the neighboring words in the service request are correlated with neighboring words in the knowledge base. The knowledge base is then searched for relevant articles using the search query vector.

Neighboring words in the knowledge base that are not neighboring words in the service request, or even present in the service request, can be added to the search query vector.

Some embodiments of the invention are related to a method for searching using term selection from a document to find similar content. The method includes providing formally written articles, selecting one or more tokens in each article by identifying candidate root words, calculating, using a processor operatively coupled with a memory, a term frequency-inverse document frequency (TF-IDF) score for each of the candidate root words, and selecting the candidate root words as tokens based on the TF-IDF scores, cataloging neighboring tokens for each selected token into a data structure for each article, where neighboring tokens include tokens that are within a threshold number of words to the selected token in an article, merging the data structures between the articles into a merged data structure, providing a written correspondence, selecting one or more tokens in the correspondence by identifying candidate root words from the correspondence, computing a TF-IDF score for each of the candidate root words in the correspondence with respect to a corpus of other correspondence, and selecting the candidate root words as tokens based on the TF-IDF scores, ascertaining neighboring tokens for each selected token in the correspondence, finding a match between a token in the correspondence and in the merged data structure, for the matched token, counting how many neighboring tokens in the merged data structure are also neighboring tokens in the correspondence, adding the matched token to a query vector based on the counting, and performing a search of the formally written articles using the query vector.

The matched token can be added to the query vector based on having a minimum threshold number of neighboring tokens in the merged data structure also being neighboring tokens in the correspondence, thereby excluding from the query vector high scoring terms in the correspondence that are specific to correspondence but not correlated among substantive, technical terms in formal written articles. The method can include inserting a neighboring token from the merged data structure that is not a token in the correspondence, thereby expanding terms in the query vector beyond those that are in the correspondence.

The method can include returning search results based on the search. It can include building a data structure for the neighboring tokens in the correspondence, wherein the data structure for the neighboring tokens in the correspondence is of a same data type as the merged data structure. It can include tracking a minimum number of words between two tokens as a weight, and merging the data structures using the minimum number of words.

The method can include retaining a minimum number of words between two tokens when merging as a weight. The selecting of tokens in each article, cataloging, and merging can be performed before the written correspondence is provided. The method can include calculating a logarithm of how many neighboring tokens in the data structure are also neighboring tokens in the correspondence, and adding the matched token to the query vector only if the logarithm is above a threshold value. The neighboring tokens can include tokens that are within 50 to 100 words of the selected token in an article. The candidate root words can be selected as tokens if they are above a transition point. The candidate root words can be selected as tokens if they are in a fourth quartile of scores. The data structure can include an inverted index. The correspondence can include an informal email, and the correspondence can include a service request for technical assistance. The formally written articles can include a knowledge base article.

Yet other embodiments relate to systems executing the above-referenced methods and machine-readable tangible storage media that employ or store instructions for the methods described above.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Novel techniques are described that are used for building search queries from informal correspondence to query more formal knowledge base articles. Terms in the informal correspondence are scored using a term frequency-inverse document frequency (TF-IDF) score with respect to other correspondence. Nearby neighbors of the terms are compared with those in a pre-merged graph of the knowledge base. In some embodiments, only those terms in the correspondence that have the same neighbors as the same terms in the knowledge base are added to the search query.

A "root word" includes a word that is an a non-inflected form and that is a primary lexical unit of a word family, such as a base word, or as otherwise known in the art. It lacks a prefix or suffix A "word family" includes all words made from the base form of a word and its inflected and derived forms made from affixes. Inflectional affixes can include third person -s, -ed, -ing, plural -s, possessive -s, comparative -er and superlative -est, while derivational affixes can include -able, -er, -ish, -less, -ly, -ness, -th, -y, non-, un-, -al, -ation, -ess, -ful, -ism, -ist, -ity, -ize, -ment, in- and others as known in the art.

Service request content and knowledge article content are often referred to as unstructured content.

A "token" includes an all lowercase (or all uppercase) stemmed form of a word from unstructured content. Series of tokens in unstructured content can be referred to as a "token vector."

In some embodiments, a TF-IDF (term frequency-inverse document frequency) score is calculated for each token. A TF-IDF score is a numerical statistic that is largely intended to reflect how important a token is to a document in a collection or corpus. A TF-IDF value increases proportionally to the number of times a token appears in the document, but is offset by the frequency of the token in the corpus. This helps to control for the fact that some tokens are generally more common than others.

In the prior art, a common practice to list high precision, formally written knowledge articles that are closely related to a service request is to pick tokens from a service request that have high TF-IDF scores in knowledge articles and then search for those token vectors in knowledge articles. However this approach poses several problems.

For example, tokens from service requests having with high TF-IDF score in knowledge articles might not be useful candidates to be added in the query token vector. Consider the following example sentences from service requests:

a) If you believe program running on dav04idc to be in error please see xyz.com/junk and report to Oracle Support. Exception seen in the logs is: oracle.apps.fnd.framework.OAException:java.lang.NullPointerException b) Hello Katherine, your issue was transferred to me. My name is Martin. I'm in Europe timezone, and I will be helping you with your issue. Regard Martin c) Closing month end and ran the payables accounting process. SOLUTION: this section lists invoice lines. Cause The problem was occurring because party_site was getting passed as null.

d) It's an Issue with record containing "data\ub97c" fix applied for Supplier Bank Account No.

Tokens colored in bold (both un-italicized and italicized) are rare in knowledge articles. That is, they exist in knowledge articles but very rarely. TF-IDF scores for these tokens are high. While searching for relevant high precision knowledge articles, tokens in bold italics are not as important because they fall in one of the following categories:

i) Are specific to customer environment;
ii) Come from spelling mistakes;
iii) Are data-specific issues. The token might be present in knowledge repository for altogether a different context;
iv) Are proper names, such as person or location names;
v) Are colloquial style terms, slang, gibberish content, salutations, or emotional/affectionate terms.

In example sentence a), server names and an employee GUID are improperly considered terms with a high TF-IDF score. In example sentence b), person names, location names, organization names, and colloquial style terms, slang, gibberish content, salutations, emotional/affectionate terms are improperly considered as terms with high TF-IDF scores. In example sentence c), a spelling mistake, typing errors, and writing styles are improperly considered as terms with high TF-IDF scores. In example sentence d), an exactly-the-same data issue term might be present in a repository for a different context is improperly considered as a term with a high TF-IDF score.

A first solution for the above-referenced problems can include several operations. First, one can build a graph (i.e., a data structure) for tokens from each knowledge article in which each token has a high TF-IDF score.

Tokens can be selected by identifying candidate root words of rare words, calculating a TF-IDF score for each of the candidate root words, and selecting the candidate root words as tokens based on the highest (or lowest) TF-IDF scores.

Building the graph can include taking tokens with a score falling in the 4th quartile of scores, creating a vertex (i.e., a node) for every term having high TF-IDF score, and creating an edge (i.e., a connection) from a vertex to all those vertices that are within the vicinity of N tokens within a single document. Second, one can merge the graph of all knowledge documents. Third, for (n) high TF-IDF scoring tokens in the service request, then for any token to be an eligible candidate in a query token vector, it must have at least log(n) edges (or fixed number of edges) to other eligible high tf-idf scoring terms. This enforces that tokens with high TF-IDF scores are important only if there are at least log(n) witnesses.

The first solution is not likely to remove proper names and colloquial style terms, as some of these tokens may be more common in knowledge articles.

To handle these terms, a second solution is to validate that each token has a high TF-IDF score in the service request repository as well. That is, remove tokens that do not have high TF-IDF scores in the service request repository.

Traditionally the TF-IDF model cosine the similarity between document d(j) and query q can be calculated.

The approach only expects calculating the TF-IDF score for the tokens of the target repository. However since in a customer relationship management environment there is a separate repository for service requests and a separate repository for knowledge articles, one can calculate the TF-IDF score for the tokens from both the repositories and selecting the tokens having high TF-IDF scores in both repositories.

Individual tokens might be present in multiple documents. Small documents containing individual tokens may be ranked higher, thus not giving good matches. However, searching the tokens as phrases or bi-grams or tri-grams poses a question on how to construct the phrases or bi-grams or tri-grams or n-grams.

A third solution for the above-referenced problems can include several operations. A graph can be built for tokens from each knowledge articles having high TF-IDF scores. Building the graph can include taking tokens with a score falling in 4th quartile of scores, creating a vertex for every term having high tf-idf score, and creating an edge from the vertex to nearest high scoring TF-IDF vertex. Instead of selecting a particular percentile, one can use a transition point to select the high scoring TF-IDF scores. One can track the minimum number of words between the two terms as weight of the edge. Second, the graphs of all of the knowledge documents are merged, retaining the minimum number of words between words between the two terms as the weight of the edge in the master graph. Third, for every high TF-IDF scoring term, locate a term in the graph that has the shortest distance to other high scoring TF-IDF terms (i.e., neighboring tokens) such that the distance is less than (n) words and number of edges traversed is less than X.

Figure 1:
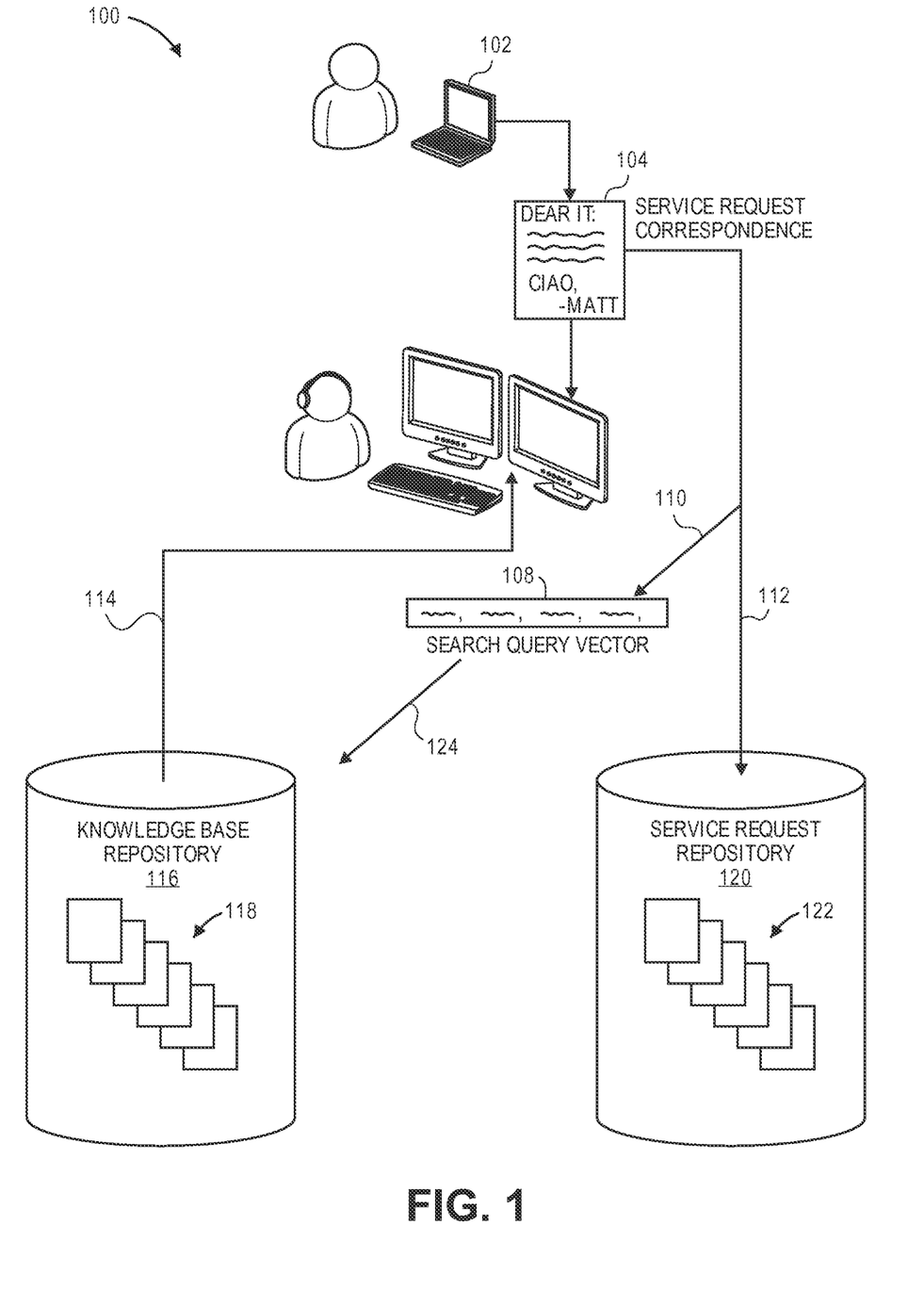
FIG. 1 illustrates service request processing in accordance with an embodiment.

FIG. 1 illustrates service request processing in accordance with an embodiment. In customer relationship management (HRM) system 100, customer 102 sends service request correspondence 104 to her information technology (IT) department. Specifically, correspondence 104 goes to service representative computer 106.

At the same time, service request 104 is automatically added to service request repository 120, to be stored with other service request correspondences 122.

In path 110, service representative computer 106 computes a TF-IDF for terms in service request correspondence 104 with respect to other correspondence 122 in service request repository 120. That is, an intra-document term frequency (TF) is computed for the content intrinsic to the correspondence, and an inverse document frequency (IDF) is computed for content in the other correspondence. The other correspondence may include correspondence 104.

Service representative computer 106 compares high TF-IDF terms from the correspondence 104 with those of a merged graph of knowledge base documents 118 of knowledge base repository 116. These documents typically have less of the eccentricities as categorized in items i) through v) above. That is, formal knowledge base articles typically are not specific to a particular customer's environment, have less spelling mistakes, avoid proper name, and minimize colloquial style terms, etc.

In path 124, nearby neighbor tokens to each token in correspondence 104 are compared with the nearby neighbors of tokens found in merged knowledge base 116. Determining a nearby neighbor can include identifying tokens that are within a specific number of words between tokens. A minimum number of words between two tokens can be tracked as a weight. Search query vector 108 is built using tokens that share the same neighbors both in correspondence 104 and in knowledge base repository documents 118. For example, a token may not be added to a search query vector unless it shares at least 1, 2, 3, 4, 5, 6, 7, 8, 9, 10, 15, 20, 25, 30, 35, 40, 45, 50, 75, 100, or more neighbors with those in a graph created from knowledge base articles 118.

Search query vector 108 is then used to search knowledge base repository 116 for relevant documents, and the search results are presented to a customer service representative at computer 106.

Figure 2:
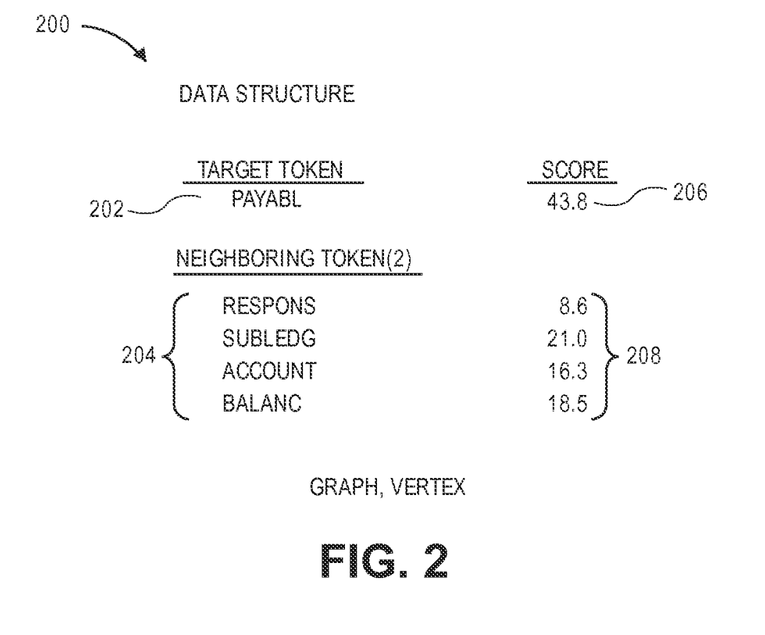
FIG. 2 illustrates a graph data structure in accordance with an embodiment.

FIG. 2 illustrates a graph data structure in accordance with an embodiment. Graph data structure 200 includes vertices, each of which represents a token. A single vertex is shown that includes an attribute for a token as well as list or index of neighboring tokens.

The vertex shown includes an entry for the token 202 "PAYABL," which is the root form of payables. It garnered score 206 of 43.8. Associated with token 202 are neighboring tokens 204 having scores 208. Neighboring tokens may also have associated weights and minimum intervening word counts. The weights and intervening word counts can be used to exclude (from a query vector) high scoring tokens that are specific to correspondence but are not correlated among substantive, technical terms in formally written knowledge articles. For example, terms like "Hello", "Regards", "Dear", "ASAP", and "escalate" can be removed.

A graph can be represented internally in a computer as an inverted index as in a table, such as Table 1 below. For an example knowledge base document text of:

Navigate Payables Responsibility > Setup > Accounting Setups > Subledger Accounting Setups > Open Account Balances Listing Definitions
. . . (100 more lines) . . .
In account balance SELECT * FROM ap_liability_balance WHERE invoice_id = &invoice_id order by timestamp;

In step 1, a computer processor tokenizes, stems, and identifies rarewords.

['navig', 'payabl', 'respons', 'setup', 'account', 'setup', 'subledg', 'account', 'setup', 'open', 'account', 'balanc', 'list', 'definit']
. . .
['in', 'account', 'balanc', 'select', 'from', 'ap_liability_bal', 'where', 'invoice_id', 'invoice_id', 'order', 'by', 'timestamp']

In step 2, phrases are identified.
payabl respons
subledg account
In step 3, two graphs are built for each knowledge base document.

TABLE 1

| Rarewords Network | Graph 1 Rareword Sequence | Graph 2 Rareword Sequence |
| --- | --- | --- |
| 1. payabl | [2, 3, 4, 5] | [2 (4)] |
| 2. subledg | [1, 3, 4, 5] | [3 (4)] |
| 3. balanc | [1,2, 4, 5, 6, 7, 8] | [3 (200), 6(2)] |
| 4. payabl respons | [1, 2, 3, 5] | [2 (3)] |
| 5. subledg account | [1, 2, 3, 4] | [3 (3)] |
| 6. ap_libability_bal | [3, 7, 8] | [7 (1)] |

TABLE 1-continued

| Rarewords Network | Graph 1 Rareword Sequence | Graph 2 Rareword Sequence |
|---|---|---|
| 7. invoice_id | [3, 6, 8] | [8 (2)] |
| 8. timestamp | [3, 6, 7] | [7 (2)] |

In step 4, the graphs are merged for all of the knowledge base documents. In order to merge graphs, for rarewords (e.g., tokens), the edges are appended to a vertex if the edge does not already exist. For a rareword sequence graph, an edge is appended to a vertex if it does not exist; however, if it does exist, then retain the one with minimum cost.

Figure 3:
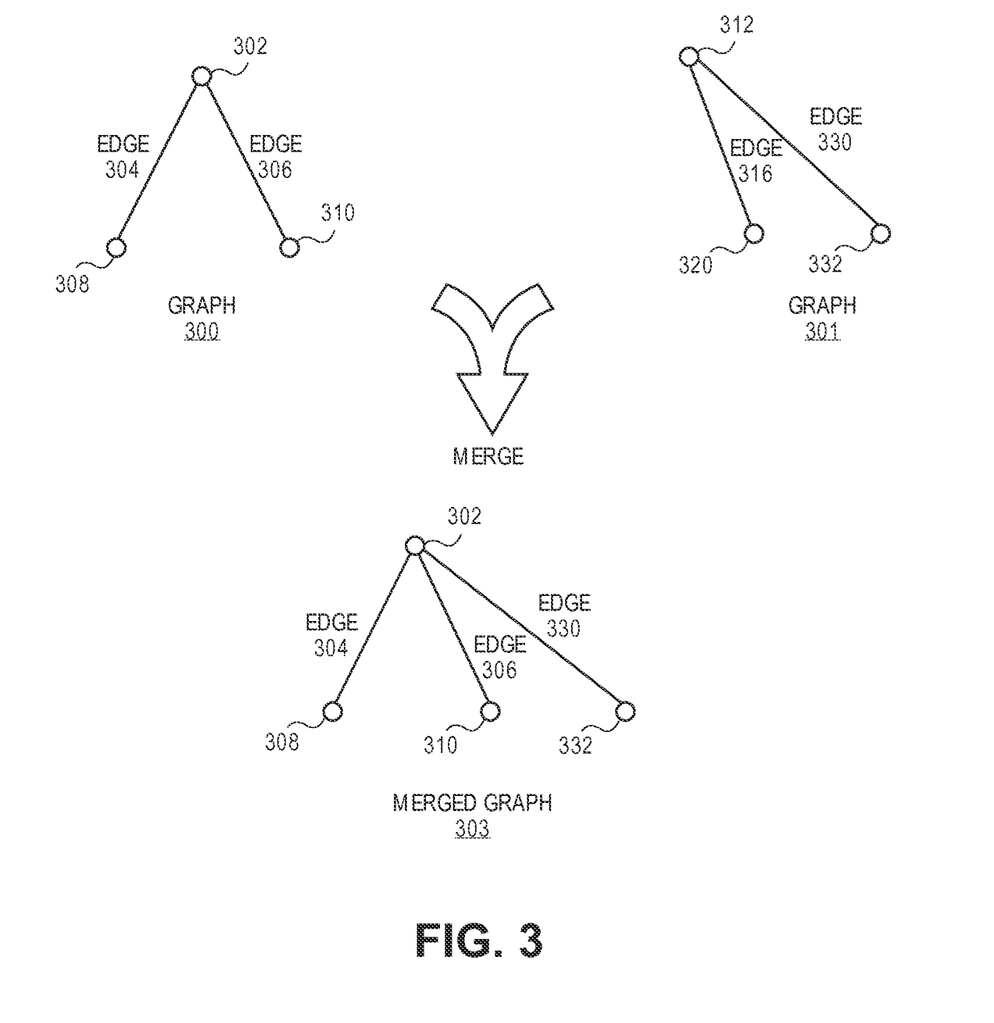
FIG. 3 illustrates merging graphs in accordance with an embodiment.

FIG. 3 illustrates merging graphs in accordance with an embodiment.

Graph 300 includes vertices 302, 308, and 310. Vertices 302 and 308 are connected by edge 304, and vertices 302 and 310 are connected by edge 310. Each vertex corresponds to a token. Each edge between vertices represents that the two connected vertices are neighbors of one another.

Graph 301 includes vertices 312, 320, and 332. Vertices 312 and 320 are connected by edge 316, and vertices 312 and 332 are connected by edge 330. Vertex 312 has the same token as vertex 302, and vertex 320 has the same token as vertex 310. Edges 306 and 316 show that in both graphs, tokens in vertices 302/312 are similarly connected to tokens in vertices 310/320.

To merge graphs 300 and 301, the union of the vertices and edges are taken. In merged graph 303, vertex 302 is connected by edge 304 to vertex 308. Vertex 302 is also connected by edge 306 to vertex 310, which is common between graphs 300 and 301. Vertex 302 is connected by edge 330 to vertex 332. In this way, graph data structures from multiple documents can be merged into a merged graph data structure.

One can build high quality bi-grams and tri-grams in some embodiments. One can build a graph using knowledge based documents by creating a vertex for every term having a high TF-IDF score then creating an edge to the nearest high scoring TF-IDF vertex. Track the number of words between the two terms as the weight of the edge. One can merge the graphs of all documents by retaining the minimum number of words between the two terms as a weight of the edge in the master (merged) graph. For every high TF-IDF scoring term, one can locate a term in the graph that has the shortest distance to other high scoring TF-IDF terms such that the distance is less than N words and the number of nodes traversed is less than X. It has been shown that N=25 and X=2 work well in some embodiments.

Figure 4:
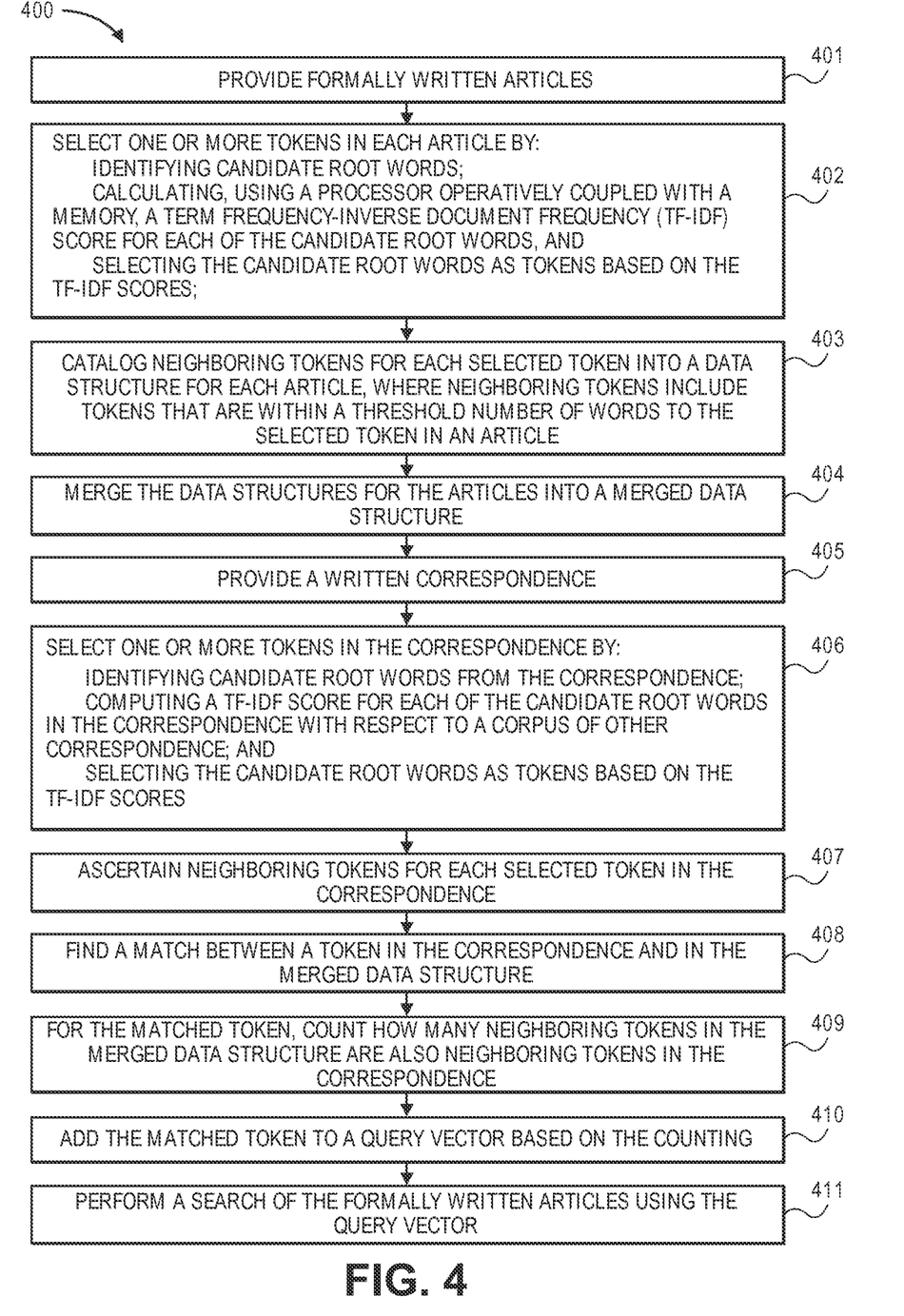
FIG. 4 is a flowchart illustrating a process in accordance with an embodiment.

FIG. 4 is a flowchart illustrating process 400 in accordance with an embodiment. The process can be implemented by computer by executing instructions in a processor or otherwise. In operation 401, formally written articles, such as knowledge base articles, are provided. In operation 402, one or more tokens in each article are selected by: identifying candidate root words; calculating, using a processor operatively coupled with a memory, a term frequency-inverse document frequency (TF-IDF) score for each of the candidate root words; and selecting the candidate root words as tokens based on the TF-IDF scores. In operation 403, neighboring tokens for each selected token are categorized into a data structure, such as that in FIG. 2, for each article, where neighboring tokens include tokens that are within a threshold number of words to the selected token in an article. In operation 404, the data structures for the articles are merged into a merged data structure. In operation 405, a written correspondence is provided. In operation 406, one or more tokens are selected in the correspondence by: identifying candidate root words from the correspondence; computing a TF-IDF score for each of the candidate root words in the correspondence with respect to a corpus of other correspondence; and selecting the candidate root words as tokens based on the TF-IDF scores. In operation 407, neighboring tokens are ascertained for each selected token in the correspondence. In operation 408, a match between a token in the correspondence and in the merged data structure is found. In operation 409, for the matched token, one counts how many neighboring tokens in the merged data structure are also neighboring tokens in the correspondence. In operation 410, the matched token is added to a search query vector based on the counting. In operation 411, a search of the formally written articles is performed using the query vector.

Computing Equipment

Figure 5:
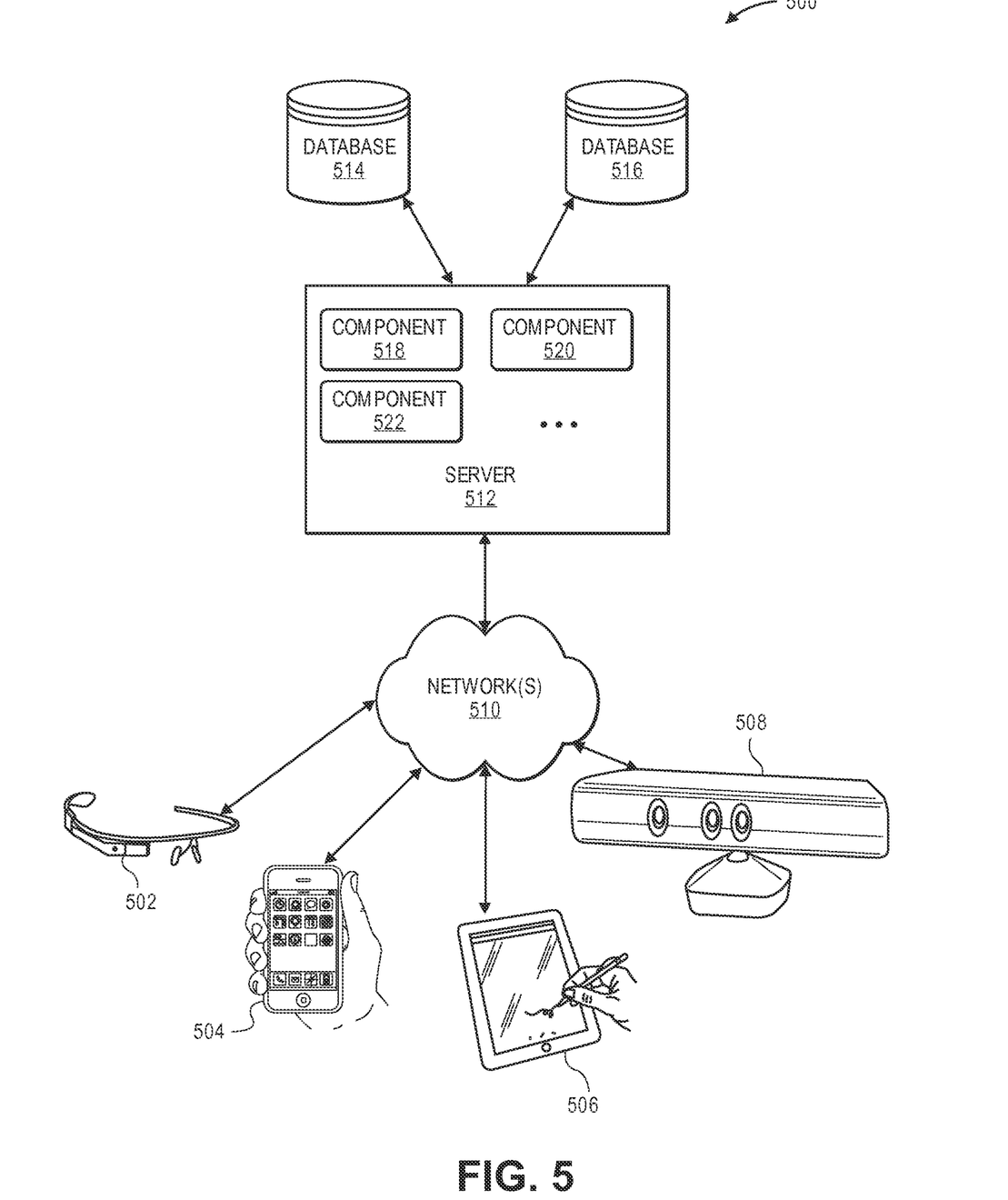
FIG. 5 depicts a simplified diagram of a distributed system for implementing one of the embodiments.

FIG. 5 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 502.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization. One or more flexible pools of logical storage devices can be virtualized to maintain virtual storage devices for the server. Virtual networks can be controlled by server 512 using software defined networking In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands.

Figure 6:
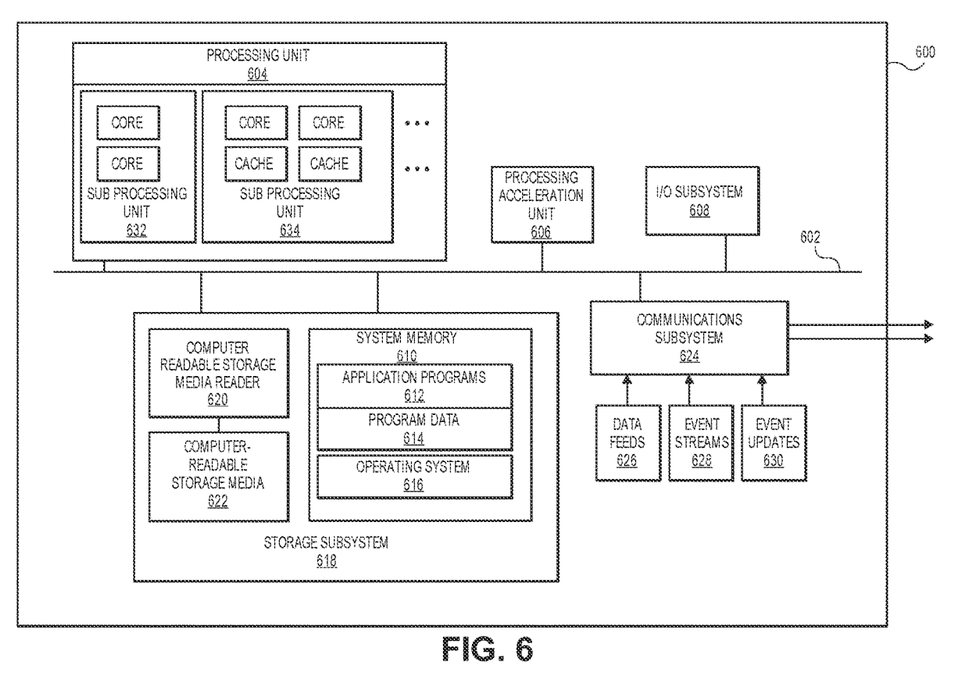
FIG. 6 illustrates an exemplary computer system, in which various embodiments of the present invention may be implemented.

FIG. 6 illustrates an exemplary computer system 600, in which various embodiments of the present invention may be implemented. The system 600 may be used to implement any of the computer systems described above. As shown in the figure, computer system 600 includes a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 includes tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which can be implemented as one or more integrated circuits (e.g., a conventional microprocessor or microcontroller), controls the operation of computer system 600. One or more processors may be included in processing unit 604. These processors may include single core or multicore processors. In certain embodiments, processing unit 604 may be implemented as one or more independent processing units 632 and/or 634 with single or multicore processors included in each processing unit. In other embodiments, processing unit 604 may also be implemented as a quad-core processing unit formed by integrating two dual-core processors into a single chip.

In various embodiments, processing unit 604 can execute a variety of programs in response to program code and can maintain multiple concurrently executing programs or processes. At any given time, some or all of the program code to be executed can be resident in processor(s) 604 and/or in storage subsystem 618. Through suitable programming, processor(s) 604 can provide various functionalities described above. Computer system 600 may additionally include a processing acceleration unit 606, which can include a digital signal processor (DSP), a special-purpose processor, and/or the like.

I/O subsystem 608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may comprise a storage subsystem 618 that comprises software elements, shown as being currently located within a system memory 610. System memory 610 may store program instructions that are loadable and executable on processing unit 604, as well as data generated during the execution of these programs.

Depending on the configuration and type of computer system 600, system memory 610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 618 may also provide a tangible computer-readable storage medium for storing the basic programming and data constructs that provide the functionality of some embodiments. Software (programs, code modules, instructions) that when executed by a processor provide the functionality described above may be stored in storage subsystem 618. These software modules or instructions may be executed by processing unit 604. Storage subsystem 618 may also provide a repository for storing data used in accordance with the present invention.

Storage subsystem 600 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for temporarily and/or more permanently containing, storing, transmitting, and retrieving computer-readable information.

Computer-readable storage media 622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 600.

By way of example, computer-readable storage media 622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to connect to one or more devices via the Internet. In some embodiments communications subsystem 624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

In some embodiments, communications subsystem 624 may also receive input communication in the form of structured and/or unstructured data feeds 626, event streams 628, event updates 630, and the like on behalf of one or more users who may use computer system 600.

By way of example, communications subsystem 624 may be configured to receive data feeds 626 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 624 may also be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for searching using term selection from a document to find similar content, the method comprising:
   providing, by a processor comprising a memory, a plurality of articles from a knowledge base;
   selecting one or more tokens in each article by:
      identifying candidate root words;
      calculating, using the processor operatively coupled with the memory, a term frequency-inverse document frequency (TF-IDF) score for each of the candidate root words; and
      selecting the candidate root words as tokens based on TF-IDF scores;
   for each selected token in each article, associating the selected token with one or more neighboring tokens in the respective article, wherein the one or more neighboring tokens includes tokens that are within a threshold number of words to the respective selected token in the respective article;
   for each article, preserving the associated one or more neighboring tokens for each selected token in that article into a data structure, wherein building the data structure comprises:
      creating a vertex for every token having a high TF-IDF score;
      creating an edge for vertices within a predetermined vicinity of tokens of the selected tokens;
   merging data structures for the articles into a merged data structure based on a union of the vertices and edges;

retaining a minimum number of words between two words as a weight of an edge in the merged data structure;

providing an informal correspondence comprising a service request, wherein the service request in the informal correspondence comprises a query for resolving a technical issue;

determining a plurality of common words in the informal correspondence comprising the service request;

automatically selecting, by the processor, one or more tokens in the informal correspondence comprising the service request by:

identifying candidate root words from the correspondence comprising the service request, wherein the candidate root word is not included in the plurality of determined common words in service requests;

computing a TF-IDF score for each of the candidate root words in the correspondence with respect to a corpus of other correspondence;

determining the candidate root words having the TF-IDF score above a predetermined value, wherein the candidate root words having the TF-IDF score above the predetermined value are high scoring words;

for each of that candidate root words that are high scoring words, determining whether the candidate root word is within a predetermined number of edges to other candidate root words that are high scoring words; and selecting the candidate root words having high TF-IDF scores and being within the predetermined number of edges to other candidate root words that are high scoring words as tokens;

ascertaining neighboring tokens for each selected token in the correspondence;

finding a match between a token in the correspondence and a token in an article in the merged data structure;

for the matched token, determining a number of neighboring tokens associated with the matched token in the article in the merged data structure that are also neighboring tokens to the matched token in the correspondence, wherein the neighboring tokens to the matched token in the correspondence includes tokens within the threshold number of words to the matched token in the correspondence;

identifying a query vector that includes the matched token that shares the same neighboring tokens both in the informal correspondence and in the knowledge base;

adding the matched token to the identified query vector;

performing a search of the plurality of articles in the knowledge base using the query vector; and identifying one or more articles of the plurality of articles in the knowledge base for resolving the technical issue in the query provided in the informal correspondence.

2. The method of claim 1 wherein the matched token is added to the query vector based on having a minimum threshold number of neighboring tokens in the merged data structure also being neighboring tokens in the correspondence, thereby excluding from the query vector high scoring terms in the correspondence that are specific to correspondence but not correlated among substantive, technical terms in formal written articles.

3. The method of claim 1 further comprising:

inserting a neighboring token from the merged data structure that is not a token in the correspondence, thereby expanding terms in the query vector beyond those that are in the correspondence.

4. The method of claim 1 further comprising:
returning search results based on the search.

5. The method of claim 1 further comprising:
building a data structure for the neighboring tokens in the correspondence, wherein the data structure for the neighboring tokens in the correspondence is of a same data type as the merged data structure.

6. The method of claim 1 further comprising:
tracking a minimum number of words between two tokens as a weight; and
merging the data structures using the minimum number of words.

7. The method of claim 1 further comprising:
retaining a minimum number of words between two tokens when merging as a weight.

8. The method of claim 1 wherein the selecting of tokens in each article, cataloging, and merging are performed before the informal correspondence is provided.

9. The method of claim 1 further comprising:
calculating a logarithm of how many neighboring tokens in the data structure are also neighboring tokens in the correspondence; and
adding the matched token to the query vector only if the logarithm is above a threshold value.

10. The method of claim 1 wherein the neighboring tokens include tokens that are within 50 to 100 words of the selected token in the article.

11. The method of claim 1 wherein the candidate root words are selected as tokens if they are above a transition point.

12. The method of claim 1 wherein the candidate root words are selected as tokens if they are in a fourth quartile of scores.

13. The method of claim 1 wherein the data structure includes an inverted index.

14. The method of claim 1 wherein the correspondence includes an informal email.

15. The method of claim 14 wherein the correspondence includes a service request for technical assistance.

16. A machine-readable non-transitory medium embodying information indicative of instructions for causing one or more processors to perform operations for searching using term selection from a document to find similar content, the operations comprising:

providing a plurality of articles from a knowledge base;

selecting one or more tokens in each article by:
identifying candidate root words;
calculating a term frequency-inverse document frequency (TF-IDF) score for each of the candidate root words; and
selecting the candidate root words as tokens based on TF-IDF scores;

for each selected token in each article, associating the selected token with one or more neighboring tokens in the respective article, wherein the one or more neighboring tokens includes tokens that are within a threshold number of words to the respective selected token in the respective article;

for each article, preserving the associated one or more neighboring tokens for each selected token in that article into a data structure, wherein building the data structure comprises:

creating a vertex for every token having a high TF-IDF score;

creating an edge for vertices within a predetermined vicinity of tokens of the selected tokens;

merging data structures for the articles into a merged data structure based on a union of the vertices and edges;

retaining a minimum number of words between two words as a weight of an edge in the merged data structure;

providing an informal correspondence comprising a service request, wherein the service request in the informal correspondence comprises a query for resolving a technical issue;

determining a plurality of common words in the informal correspondence comprising the service request;

automatically selecting one or more tokens in the informal correspondence comprising the service request by:
identifying candidate root words from the correspondence comprising the service request, wherein the candidate root word is not included in the plurality of determined common words in service requests;
computing a TF-IDF score for each of the candidate root words in the correspondence with respect to a corpus of other correspondence;
determining the candidate root words having the TF-IDF score above a predetermined value, wherein the candidate root words having the TF-IDF score above the predetermined value are high scoring words;
for each of that candidate root words that are high scoring words, determining whether the candidate root word is within a predetermined number of edges to other candidate root words that are high scoring words; and
selecting the candidate root words having high TF-IDF scores and being within the predetermined number of edges to other candidate root words that are high scoring words as tokens;

ascertaining neighboring tokens for each selected token in the correspondence;

finding a match between a token in the correspondence and a token in an article in the merged data structure;

for the matched token, determining a number of neighboring tokens associated with the matched token in the article in the merged data structure that are also neighboring tokens to the matched token in the correspondence, wherein the neighboring tokens to the matched token in the correspondence includes tokens within the threshold number of words to the matched token in the correspondence;

identifying a query vector that includes the matched token that shares the same neighboring tokens both in the informal correspondence and in the knowledge base;

adding the matched token to the identified query vector;

performing a search of the plurality of articles in the knowledge base using the query vector; and identifying one or more articles of the plurality of articles in the knowledge base for resolving the technical issue in the query provided in the informal correspondence.

17. The medium of claim 16 wherein the matched token is added to the query vector based on having a minimum threshold number of neighboring tokens in the merged data structure also being neighboring tokens in the correspondence,
thereby excluding from the query vector high scoring terms in the correspondence that are specific to correspondence but not correlated among substantive, technical terms in formal written articles.

18. A computer system executing instructions in a computer program for searching using term selection from a document to find similar content, the computer system comprising:

a processor; and a memory operatively coupled with the processor, the processor executing instructions stored in the memory including:

program code for providing a plurality of articles from a knowledge base;

program code for selecting one or more tokens in each article by:
program code for identifying candidate root words;
program code for calculating a term frequency-inverse document frequency (TF-IDF) score for each of the candidate root words; and
program code for selecting the candidate root words as tokens based on TF-IDF scores;

program code for associating, for each selected token in each article, the selected token with one or more neighboring tokens in the respective article, wherein the one or more neighboring tokens includes tokens that are within a threshold number of words to the respective selected token in the respective article;

program code for preserving, for each article, the associated one or more neighboring tokens for each selected token in that article into a data structure, wherein building the data structure comprises:
creating a vertex for every token having a high TF-IDF score;
creating an edge for vertices within a predetermined vicinity of tokens of the selected tokens;

program code for merging data structures for the articles into a common data structure based on a union of the vertices and edges;

retaining a minimum number of words between two words as a weight of an edge in the merged data structure;

program code for providing an informal correspondence comprising a service request, wherein the service request comprises a query for resolving a technical issue;

program code for determining a plurality of common words in the informal correspondence comprising the service request;

program code for automatically selecting one or more tokens in the informal correspondence comprising the service request by:
program code for identifying candidate root words from the correspondence comprising the service request, wherein the candidate root word is not included in the plurality of determined common words in service requests;
program code for computing a TF-IDF score for each of the candidate root words in the correspondence with respect to a corpus of other correspondence
program code for determining the candidate root words having the TF-IDF score above a predetermined value, wherein the candidate root words having the TF-IDF score above the predetermined value are high scoring words;
for each of that candidate root words that are high scoring words, program code for determining whether the candidate root word is within a predetermined number of edges to other candidate root words that are high scoring words; and
program code for selecting the candidate root words having high TF-IDF scores and being within the predetermined number of edges to other candidate root words that are high scoring words;

program code for ascertaining neighboring tokens for each selected token in the correspondence;

program code for finding a match between a token in the correspondence and a token in an article in the merged data structure;

program code for counting, for the matched token, determining a number of neighboring tokens associated with the matched token in the article in the merged data structure that are also neighboring tokens to the matched token in the correspondence, wherein the neighboring tokens to the matched token in the correspondence includes tokens within the threshold number of words to the matched token in the correspondence;

program code for identifying a query vector that includes the matched token that shares a same neighboring tokens both in the informal correspondence and in the knowledge base:

program code for adding the matched token to the identified query vector;

program code for performing a search of the plurality of articles in the knowledge base using the query vector; and identifying one or more articles of the plurality of articles in the knowledge base for resolving the technical issue in the query provided in the informal correspondence.

19. The system of claim 18 wherein the matched token is added to the query vector based on having a minimum threshold number of neighboring tokens in the merged data structure also being neighboring tokens in the correspondence, thereby excluding from the query vector high scoring terms in the correspondence that are specific to correspondence but not correlated among substantive, technical terms in formal written articles.

* * * * *

UNITED STATES PATENT AND TRADEMARK OFFICE
CERTIFICATE OF CORRECTION

PATENT NO. : 11,392,629 B2
APPLICATION NO. : 14/546340
DATED : July 19, 2022
INVENTOR(S) : Pranav Kumar Agarwal It is certified that error appears in the above-identified patent and that said Letters Patent is hereby corrected as shown below:

In the Specification

In Column 3, Line 37, delete "an a" and insert -- a --, therefor.

In Column 3, Line 40, delete "suffix" and insert -- suffix. --, therefor.

In Column 4, Line 17, delete "Cause" and insert -- Cause: --, therefor.

In Column 5, Line 42, delete "(HRM)" and insert -- (CRM) --, therefor.

In Column 9, Line 27, delete "Internet" and insert -- Internetwork --, therefor.

In Column 9, Lines 51-52, delete "networking" and insert -- networking. --, therefor.

In the Claims

In Column 19, Line 17, in Claim 18, delete "base:" and insert -- base; --, therefor.

Signed and Sealed this
Third Day of January, 2023

Katherine Kelly Vidal
*Director of the United States Patent and Trademark Office*